United States Patent
Yin et al.

(10) Patent No.: US 8,432,130 B2
(45) Date of Patent: Apr. 30, 2013

(54) WIRELESS RECHARGEABLE BATTERY

(75) Inventors: Nan-Jiun Yin, Hsin-Chu (TW); Ming-Lung Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 312 days.

(21) Appl. No.: 12/907,012

(22) Filed: Oct. 18, 2010

(65) Prior Publication Data
US 2011/0210697 A1 Sep. 1, 2011

(30) Foreign Application Priority Data
Feb. 26, 2010 (CN) ...................... 2010 2 0132361 U

(51) Int. Cl.
*H02J 7/00* (2006.01)
(52) U.S. Cl.
USPC ......................................................... 320/108
(58) Field of Classification Search ................... 320/108
See application file for complete search history.

(56) References Cited

U.S. PATENT DOCUMENTS

| | | | | |
|---|---|---|---|---|
| 7,944,171 | B2* | 5/2011 | Yeh ................. | 320/108 |
| 8,193,764 | B2* | 6/2012 | Jakubowski .................. | 320/108 |
| 2002/0113572 | A1 | 8/2002 | Zink et al. | |
| 2004/0183502 | A1* | 9/2004 | Cheng .......................... | 320/108 |
| 2007/0222681 | A1 | 9/2007 | Greene et al. | |
| 2009/0058361 | A1* | 3/2009 | John ............................. | 320/128 |
| 2009/0133733 | A1* | 5/2009 | Retti ............................ | 136/206 |
| 2009/0261778 | A1 | 10/2009 | Kook | |
| 2010/0264871 | A1* | 10/2010 | Matouka et al. ............. | 320/108 |
| 2010/0264872 | A1* | 10/2010 | Kwong ......................... | 320/108 |
| 2011/0057606 | A1* | 3/2011 | Saunamaki ................... | 320/108 |
| 2011/0115429 | A1* | 5/2011 | Toivola et al. ............... | 320/108 |

FOREIGN PATENT DOCUMENTS
TW 200931701 7/2009

OTHER PUBLICATIONS
"Extended European Search Report of Europe Counterpart Application", issued on May 31, 2011, p. 1-p. 6.

* cited by examiner

*Primary Examiner* — M'Baye Diao
(74) *Attorney, Agent, or Firm* — Jianq Chyun IP Office

(57) ABSTRACT

A wireless rechargeable battery includes a housing, a circuit module, an energy storage unit, and a plurality of electrodes. The wireless rechargeable battery is adapted to be disposed on a wireless charging device to be wirelessly charged. The circuit module includes a receiving unit and a power management unit. The receiving unit is disposed in the housing and adapted to receive electric energy from the wireless charging device. The power management unit is disposed in the housing and electrically coupled to the receiving unit. The energy storage unit is disposed in the housing and electrically coupled to the power management unit. The electric energy is adapted to be inputted to the energy storage unit via the power management unit. The electrodes are disposed on the housing and electrically coupled to the power management unit. The electric energy is adapted to be outputted to the electrodes via the power management unit.

8 Claims, 4 Drawing Sheets

WIRELESS RECHARGEABLE BATTERY

CROSS-REFERENCE TO RELATED APPLICATION

This application claims the priority benefit of China application serial no. 201020132361.9, filed on Feb. 26, 2010. The entirety of the above-mentioned patent application is hereby incorporated by reference herein and made a part of this specification.

BACKGROUND OF THE INVENTION

1. Field of the Invention

The invention relates to a rechargeable battery, and more particularly, to a wireless rechargeable battery.

2. Description of Related Art

Following the increasing maturing of wireless charging technology, various electronic products may be charged in a wireless manner to replace the traditional contact-type charging. For example, mouse, remote controller or mobile phones may include built-in wireless charging receiving unit and may be disposed on a wireless charging device to be wirelessly charged. However, currently many commercially available electronic devices do not have built-in wireless charging receiving unit and therefore cannot be charged wirelessly. They may only be charged in the contacting manner or powered by a replacement battery.

Taiwan Patent Public No. 200931701 discloses a cylindrical battery with aluminum-plastic film packaging.

SUMMARY OF THE INVENTION

Accordingly, the invention is directed to a wireless rechargeable battery, and the wireless rechargeable battery may be disposed on a wireless charging device to be wirelessly charged.

One embodiment of the present disclosure provides a wireless rechargeable battery for being disposed on a wireless charging device to be wirelessly charged. The wireless rechargeable battery includes a housing, a circuit module, an energy storage unit, and a plurality of electrodes. The circuit module includes a receiving unit and a power management unit. The receiving unit is disposed in the housing and adapted to receive electric energy from the wireless charging device. The power management unit is disposed in the housing and electrically coupled to the receiving unit. The energy storage unit is disposed in the housing and electrically coupled to the power management unit. The electric energy is adapted to be inputted from the receiving unit to the energy storage unit via the power management unit. The electrodes are disposed on the housing and electrically coupled to the power management unit. The electric energy is adapted to be outputted from the energy storage unit to the electrodes via the power management unit.

In view of the forgoing, in the above embodiments of the invention, the receiving unit of the wireless rechargeable battery wirelessly receives electric energy from the wireless charging device. Afterwards, the electric energy is inputted to the energy storage unit via the power management unit, and is then outputted to the electrodes via the power management unit. As such, an electronic device having no built-in wirelessly charging receiving unit may have the wirelessly charging function by installing the wireless rechargeable battery as described above, thereby the wireless charging technology may be more widely used in various electronic devices.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
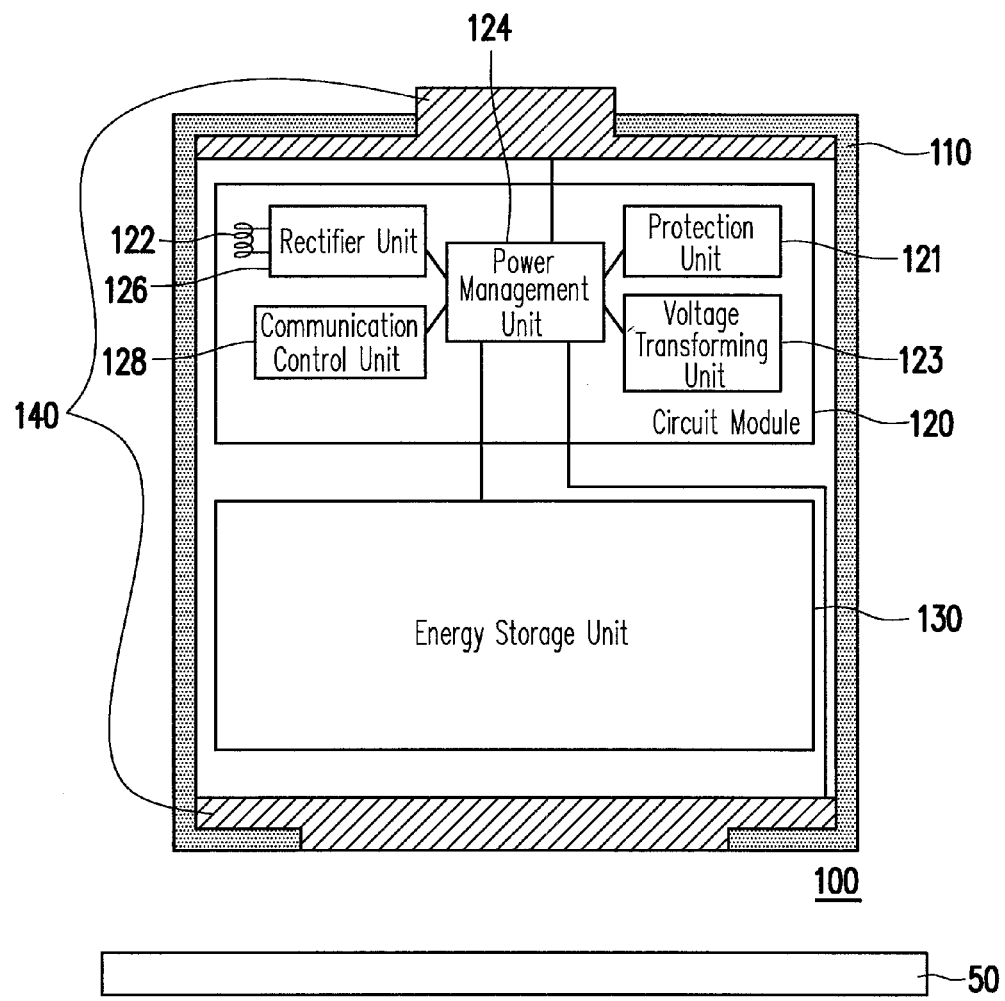
FIG. 1 illustrates a wireless rechargeable battery according to one embodiment of the invention.

Referring to FIG. 1, an embodiment of the wireless rechargeable battery 100 is adapted to be disposed on a wireless charging device 50 to be wirelessly recharged. The wireless rechargeable battery 100 includes a housing 110, a circuit module 120, an energy storage unit 130, and a plurality of electrodes 140 (two electrodes 140 are exemplarily shown in FIG. 1). The circuit module 120 includes a receiving unit 122 and a power management unit 124.

The receiving unit 122 is disposed in the housing 110 to wirelessly receive electric energy from the wireless charging device 50. The receiving unit 122 may be any device capable of energy induction, and the receiving unit 122 is implemented as a coil in the embodiment. The power management unit 124 is disposed in the housing 110 and electrically coupled to the receiving unit 122. The energy storage unit 130 is disposed in the housing 110 and electrically coupled to the power management unit 124, such that the electric energy is adapted to be inputted from the receiving unit 122 to the energy storage unit 130 via the power management unit 124. The electrodes 140 are disposed on the housing 110 and electrically coupled to the power management unit 124, such that the electric energy is adapted to be outputted from the energy storage unit 130 to the electrodes 140 via the power management unit 124.

Therefore, the embodiment of wireless rechargeable battery 100 is installed in an electronic product having no built-in wireless charging receiving unit, the electronic product may be placed on the wireless charging device 50 for wireless charging, thereby the wireless charging technology may be more widely used in various electronic devices.

More specifically, the circuit module 120 of the embodiment further includes a rectifier unit 126, a communication control unit 128, a protection unit 121, and a voltage transforming unit 123. The rectifier unit 126 is disposed in the housing 110 and electrically coupled between the receiving unit 122 and the power management unit 124. The rectifier unit 126 is used to rectify the current outputted from the receiving unit 122 to convert the current into a current in applicable phase.

The communication control unit 128 is disposed in the housing 110 and electrically coupled to the power management unit 124. The communication control unit 128 is used to output instructions to the power management unit 124 to control whether the receiving unit 122 receives electric energy from the wireless charging device 50. In the embodiment, the communication unit 128 may be any device capable of communication and control, such as, a microcontroller.

Specifically, when the circumstance of the energy storage unit 130 not being fully charged is detected by the communication control unit 128 via the power management unit 124, the communication control unit 128 may output an instruction to the power management unit 124 to control the receiving unit 122 to continuously receive electric energy from the wireless charging device 50 via the power management unit 124.

On the other hand, when the circumstance of the energy storage unit 130 being fully charged is detected by the communication control unit 128 via the power management unit 124, the communication control unit 128 may output an instruction to the power management unit 124 to control the receiving unit 122 to stop receiving electric energy from the wireless charging device 50 via the power management unit 124.

The protection unit 121 is disposed in the housing 110 and electrically coupled to the power management unit 124 to prevent the power management unit 124 from being damaged due to over voltage, over current (short-circuit) or reverse connection. The voltage transforming unit 123 is disposed in the housing 110 and electrically coupled to the power management unit 124. The voltage transforming unit 123 is used to transform the voltage to achieve the effect of voltage stabilization, such that the electric energy outputted from the power management unit 124 to the energy storage unit 130 and the electrodes 140 may have a suitable voltage.

Figure 2:
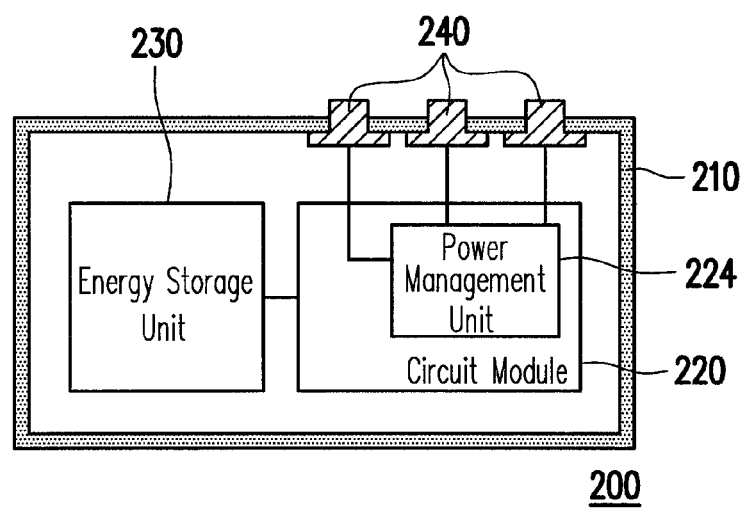
FIG. 2 illustrates a wireless rechargeable battery according to another embodiment of the invention.

It is noted the embodiment is not intended to limit the number of the electrodes. Referring to FIG. 2, the wireless rechargeable battery 200 of the embodiment includes three electrodes 240, instead of the two electrodes 140 of the wireless rechargeable battery 100 of FIG. 1. The electrodes 240 are disposed on the housing 210 and electrically coupled to the power management unit 224 of the circuit module 220, and the power management unit 220 is electrically coupled to the energy storage unit 230. It is noted that the wireless rechargeable battery 200 is mainly described herein with respect to the features shown in FIG. 2, and other parts of the wireless rechargeable battery 200 may be constructed as describe above with respect to the wireless rechargeable battery 100 of FIG. 1.

The embodiment is also not intended to limit the housing of the wireless rechargeable battery to any particular size. Rather, the housing may have any suitable size, such as, one of the battery sizes specified by American National Standards Institute (ANSI). Examples of the housing of the wireless rechargeable battery of embodiments may include:

1. a cylindrical housing having a diameter of 8.3 mm and a height of 42.5 mm;
2. a cylindrical housing having a diameter of 12 mm and a height of 30.2 mm;
3. a cylindrical housing having a diameter of 10.5 mm and a height of 44.5 mm;
4. a cylindrical housing having a diameter of 14.5 mm and a height of 50.5 mm;
5. a cylindrical housing having a diameter of 26.2 mm and a height of 50 mm;
6. a cylindrical housing having a diameter of 34.2 mm and a height of 61.5 mm;
7. a cuboid housing having a height of 48.5 mm, a length of 35.6 mm, and a width of 9.18 mm;
8. a cuboid housing having a height of 48.5 mm, a length of 26.5 mm, and a width of 17.5 mm;
9. a cuboid housing having a height of 112 mm, a length of 68.2 mm, and a width of 68.2 mm;
10. a cuboid housing having a height of 115 mm, a length of 68.2 mm, and a width of 68.2 mm; and
11. a cuboid housing having a height of 127 mm, a length of 136.5 mm, and a width of 73 mm.

Figure 3:
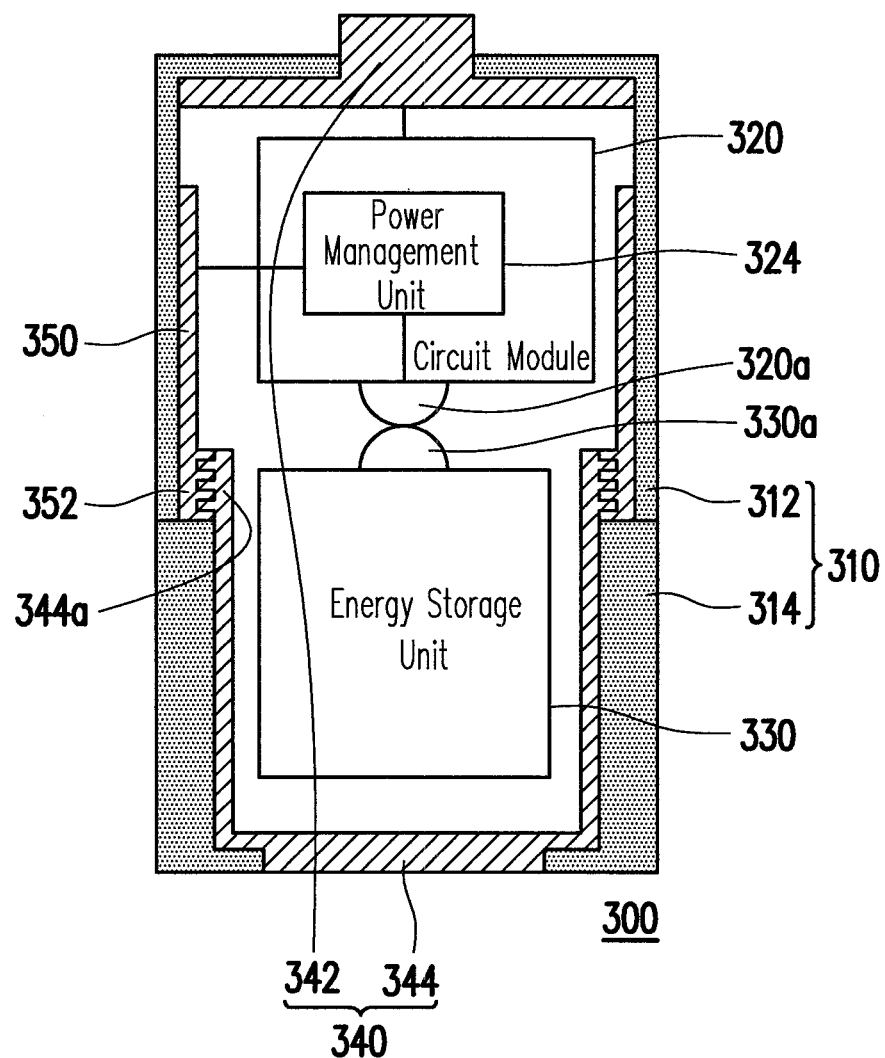
FIG. 3 illustrates a wireless rechargeable battery according to another embodiment of the invention.
Figure 4:
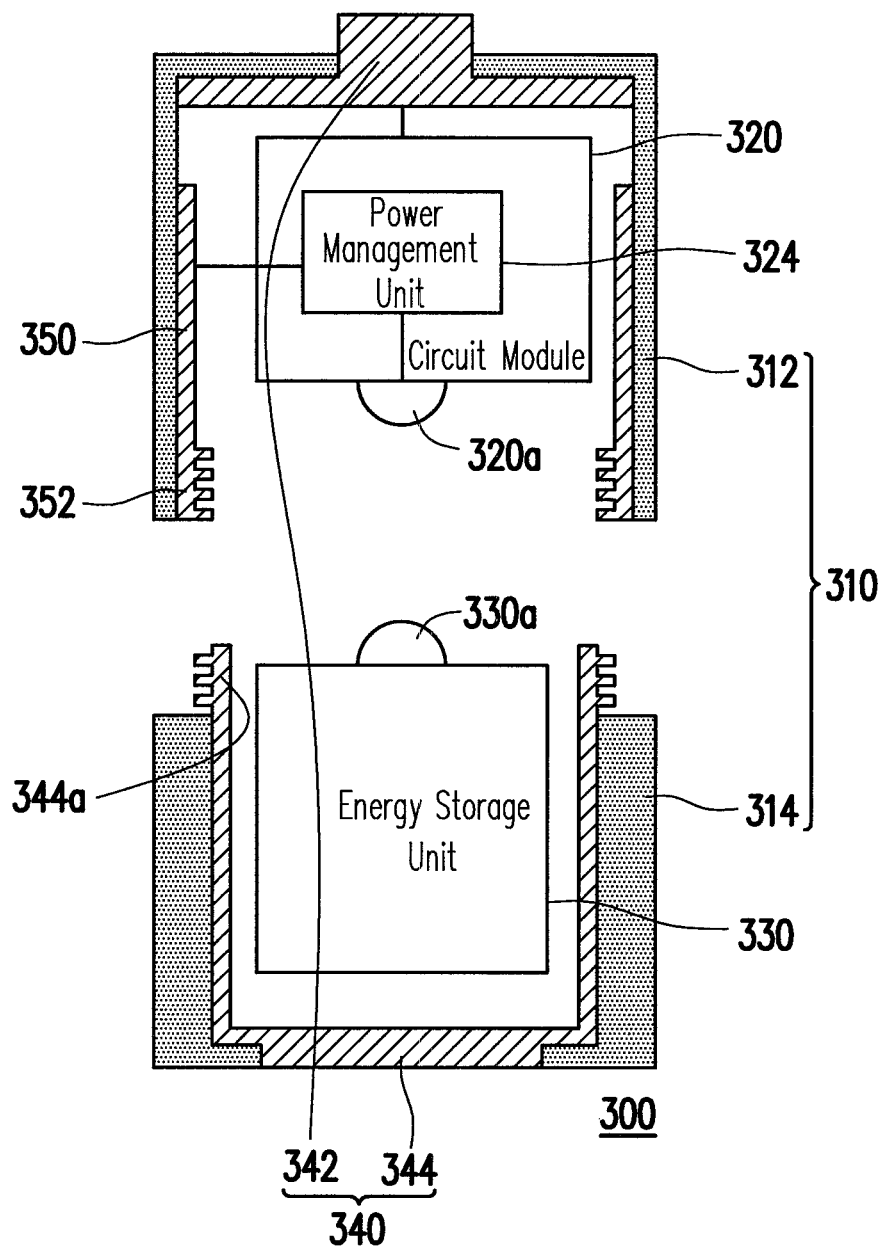
FIG. 4 illustrates a first housing part and a second housing part of FIG. 3 that are in a separated state.

Referring to FIG. 3 and FIG. 4, the wireless rechargeable battery 300 of the embodiment includes a housing 310 having a first housing part 312 and a second housing part 314. A circuit module 320 and a power management unit 324 are disposed in the first housing part 312. The second housing part 314 is detachably assembled to the first housing part 312. An energy storage unit 330 is disposed in the second housing part 314. As such, separation of the first housing part 312 and the second housing part 314 (illustrated in FIG. 4) allows for replacement of different types of energy storage units 330 to make the wireless rechargeable battery 300 suitable for various types of electronic products.

For example, if the wireless rechargeable battery 300 is to be used in a low power consumption electronic device (i.e. remote controller and wireless mouse), then the energy storage unit 330 may be an ultra-capacitor having the characteristics of being rapidly charged and no cycle count limitation; if the wireless rechargeable battery 300 is to be used in a high power consumption electronic device (i.e. electric shaver), then the energy storage unit 300 may be a high capacity Li-polymer type energy storage element.

Specifically, the circuit module 320 includes a first contact 320a, and the energy storage unit 330 includes a second contact 330a. When the second housing part 314 is assembled to the first housing part 312 as shown in FIG. 3, the first contact 320a contacts the second contact 330a such that the power management unit 324 of the circuit module 320 is electrically coupled to the energy storage unit 330.

In the embodiment, the wireless rechargeable battery 300 further includes a conductive member 350, and the conductive member 350 is disposed in the first housing part 312 and electrically coupled to the power management unit 324. The electrodes 340 of the embodiment include a first electrode 342 and a second electrode 344, and the first electrode 342 and the second electrode 344 may, for example, be the positive electrode and the negative electrode respectively of the wireless rechargeable battery 300.

The first electrode 342 is disposed in the first housing part 312 and electrically coupled to the power management unit 324, and a part of the first electrode 342 is exposed out of the first housing part 312. The second electrode 344 is disposed in the second housing part 314, and a part of the second electrode 344 is exposed out of the second housing part 314. As shown in FIG. 3, when the first housing part 312 and the second housing part 314 are assembled together, the second electrode 344 contacts the conductive member 350 to be electrically coupled to the power management unit 324 via the conductive member 350.

In practice, the conductive member 350 may include a first assembling portion 352, and the second electrode 344 may include a second assembling portion 344a. The first housing part 312 and the second housing part 314 are assembled together by the first assembling portion 352 and the second assembling portion 344a, and the conductive member 350 and the second electrode 344 are electrically coupled together by the first assembling portion 352 and the second assembling portion 344a. The first assembling portion 352 and the second assembling portion 344a of the embodiment may, for example, be an internal thread structure and an external thread structure, respectively. It is noted, however, that this should not be regarded as limiting. In other embodiments, the first assembling portion 352 and the second assembling portion 344a may be other suitable structures to be inter-assembled.

In summary, the embodiment or embodiments of the invention may have at least one of the following advantages. The receiving unit of the wireless rechargeable battery wirelessly receives electric energy from the wireless charging device. Afterwards, the electric energy is inputted to the energy storage unit via the power management unit, and then outputted to the electrodes via the power management unit. As such, an electronic device having no built-in wireless charging receiving unit may have the wirelessly charging function by installing the wireless rechargeable battery as described above, and the wireless charging technology may be more widely used in various electronic devices. In addition, the housing of the wireless rechargeable battery may be formed by a first housing part and a second housing part, and the first housing part and the second housing part are assembled together. The power management unit and the energy storage unit are disposed in the first housing part and the second housing part, respectively. The energy storage unit of the wireless rechargeable battery may be replaced through the separation of the first housing part and the second housing part, thus the wireless rechargeable battery may be suitable for various types of electronic devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wireless rechargeable battery suitable for being disposed on a wireless charging device to be wirelessly charged, the wireless rechargeable battery comprising:
    a housing, comprising:
        a first housing part; and
        a second housing part, detachably assembled to the first housing part;
    a circuit module, comprising:
        a receiving unit, disposed in the housing, wherein the receiving unit is adapted to receive electric energy from the wireless charging device; and
        a power management unit, disposed in the housing and electrically coupled to the receiving unit, wherein the power management unit is disposed inside the first housing part;
    an energy storage unit, disposed in the housing and electrically coupled to the power management unit, wherein the electric energy is adapted to be inputted from the receiving unit to the energy storage unit via the power management unit, and wherein the energy storage unit is disposed inside the second housing; and
    a plurality of electrodes, disposed on the housing and electrically coupled to the power management unit, wherein the electric energy is adapted to be outputted from the energy storage unit to the electrodes via the power management unit,
    wherein the circuit module has a first contact, and the energy storage unit has a second contact, when the second housing part is assembled to the first housing part, the first contact contacts the second contact such that the power management unit is electrically coupled to the energy storage unit.

2. The wireless rechargeable battery according to claim 1, wherein the circuit module further comprises:
    a rectifier unit, disposed in the housing and electrically coupled between the receiving unit and the power management unit, and the rectifier unit is adapted to rectify a current from the receiving unit.

3. The wireless rechargeable battery according to claim 1, wherein the circuit module further comprises:
    a communication control unit, disposed in the housing and electrically coupled to the power management unit, and the communication control unit is adapted to output instructions to the power management unit to control whether the receiving unit receives the electric energy from the wireless charging device.

4. The wireless rechargeable battery according to claim 1, wherein the circuit module further comprises:
    a protection unit, disposed in the housing and electrically coupled to the power management unit to prevent the power management unit from being damaged due to an over voltage, an over current or a reverse connection.

5. The wireless rechargeable battery according to claim 1, wherein the circuit module further comprises:
    a voltage transforming unit, disposed in the housing and electrically coupled to the power management unit, and the voltage transforming unit is adapted to transform a voltage.

6. The wireless rechargeable battery according to claim 1, further comprising:
    a conductive member, disposed in the first housing and electrically coupled to the power management unit, the electrodes comprising:

a first electrode, disposed in the first housing part and electrically coupled to the power management unit, wherein a part of the first electrode is exposed out of the first housing part; and a second electrode, disposed in the second housing part and electrically coupled to the conductive member, wherein a part of the second electrode is exposed out of the second housing part.

7. The wireless rechargeable battery according to claim 6, wherein the conductive member has a first assembling portion and the second electrode has a second assembling portion, the first housing part and the second housing part are assembled together by the first assembling portion and the second assembling portion, and the conductive member and the second electrode are electrically coupled by the first assembling portion and the second assembling portion.

8. The wireless rechargeable battery according to claim 1, wherein a size of the housing is one of battery sizes specified by American National Standards Institute.

* * * * *